(12) United States Patent
Kang et al.

(10) Patent No.: US 6,611,613 B1
(45) Date of Patent: Aug. 26, 2003

(54) APPARATUS AND METHOD FOR DETECTING SPEAKING PERSON'S EYES AND FACE

(75) Inventors: Dong-joong Kang, Suwon (KR); Sung-gul Ryoo, Suwon (KR); Ji-yeun Kim, Seoul (KR); Chang-yeong Kim, Euiwang (KR); Yang-seock Seo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 578 days.

(21) Appl. No.: 09/607,279

(22) Filed: Jun. 30, 2000

(30) Foreign Application Priority Data

Dec. 7, 1999 (KR) ........................................ 1999-55577

(51) Int. Cl.$^7$ ................................................ G06K 9/00
(52) U.S. Cl. ........................................ 382/118; 382/209
(58) Field of Search ................................ 382/118, 103, 382/190, 199, 209; 348/169; 351/204

(56) References Cited

U.S. PATENT DOCUMENTS

| | | | |
|---|---|---|---|
| 5,680,481 A | 10/1997 | Prasad et al. | 382/190 |
| 5,710,833 A * | 1/1998 | Moghaddam et al. | 382/228 |
| 5,832,115 A | 11/1998 | Rosenberg | 382/199 |
| 6,072,893 A * | 6/2000 | Luo et al. | 382/117 |
| 6,185,337 B1 * | 2/2001 | Tsujino et al. | 382/227 |
| 6,292,575 B1 * | 9/2001 | Bortolussi et al. | 382/118 |
| 6,332,033 B1 * | 12/2001 | Qian | 382/124 |
| 6,463,163 B1 * | 10/2002 | Kresch | 382/103 |

\* cited by examiner

*Primary Examiner*—Samir Ahmed
(74) *Attorney, Agent, or Firm*—Burns Doane Swecker & Mathis, LLP (57) ABSTRACT

An apparatus for detecting the position of a human face in an input image or video image and a method thereof are provided. The apparatus includes an eye position detecting means for detecting pixels having a strong gray characteristic to determine areas having locality and texture characteristics as eye candidate areas among areas formed by the detected pixels, in an input red, blue, and green (RGB) image, a face position determining means for creating search templates by matching a model template to two areas extracted from the eye candidate areas, and determining an optimum search template among the created search templates by using the value normalizing the sum of a probability distance for the chromaticity of pixels within the area of a search template, and horizontal edge sizes calculated in the positions of the left and right eyes, a mouth and a nose estimated by the search template, and an extraction position stabilizing means for forming a minimum boundary rectangle by the optimum search template, and increasing count values corresponding to the minimum boundary rectangle area and reducing count values corresponding to an area other than the minimum boundary rectangle area, among count values of individual pixels, stored in a shape memory, to output the area in which count values above a predetermined value are positioned, as eye and face areas. The apparatus is capable of accurately and quickly detecting a speaking person's eyes and face in an image, and is tolerant of image noise.

32 Claims, 7 Drawing Sheets

APPARATUS AND METHOD FOR DETECTING SPEAKING PERSON'S EYES AND FACE

This application claims priority under 35 U.S.C. §§119 and/or 365 to 99-55577 filed in Korea on Dec. 7, 1999; the entire content of which is hereby incorporated by reference.

BACKGROUND OF THE INVENTION

1. The Field of the Invention

This invention relates to image signal processing, and more particularly to apparatus and method for interpreting and extracting the features of human faces represented in images input through camera sensor or video images, to detect the human face position within the images.

2. Description of the Related Art

Recently, in the study of artificial intelligence field, attention and study has been focussed on implanting the recognition capability human beings have into a computer to endow intelligence on the computer or machine. In particular, face recognition technology using the human vision system has been very actively and widely studied throughout all fields related to computer vision and image processing, such as image processing, pattern recognition, and facial expression investigation. A technique for detecting faces and facial area is highly regarded in various applied fields such as facial expression research, drivers' drowsiness detection, entrance/exit control, or image indexing. Humans easily detect a facial area even in various and dynamic environments, while it is not an easy thing for computers to perform this, even in a relatively simple image environment.

Representative approaches in previously proposed facial area detection methods include a method of using a neural network (U.S. Pat. No. 5,680,481), a method of using the statistical features of facial brightness, such as a principal component analysis of brightness (U.S. Pat. No. 5,710,833), and a matching method proposed by T. Poggio (IEEE Transactions on Pattern Analysis and Machine Intelligence 20, 1998). In order to employ the extracted face candidate image as the input of a face recognition system, a means of detecting the exact position of facial components or facial features in the extracted face candidate region is required. In other words, in order to compare an input image with a model, position extraction and a size normalizing process for compensating for differences in size, angle, and orientation of the facial image extracted from the input image relative to a facial image of the model template are prerequisite for enhanced recognition and matching efficiency. In most face recognition systems, an eye area or the central area of a pupil is used as a reference facial component in the alignment and the normalizing processes. This is because that features of the eye area remain unchanged compared with those of other facial components, even if a change occurs in the size, expression, attitude, lighting, etc., of a facial image.

Many studies on detecting the eye area or the central position of the pupil from an image are ongoing. Methods applied to conventional face recognition systems mainly adopt a pupil detection method. A representative pupil detection method is to employ normalized correlation at all locations within an input image by making eye templates of various sizes and forming a Gaussian pyramid image of the input image. Furthermore, U.S. Pat. No. 5,680,481 and IEEE TPAMI19, 1997, by Moghaddam and T.Poggio (IEEE TPAMI 20, 1998) show a method in which eigen matrices for eyes, nose, and mouth areas are provided according to the size of a template, and features of interest are searched through comparison with an input image in all areas within the template image. A problem that both methods have in common is that all areas in an image have to be searched with several model templates classified on the basis of size or orientation for all areas of an image, since no information on size, orientation or location of eye or nose features is made available in the input image. This not only causes excessive computation, but also requires determining a threshold value for defining each area, and causes excessive false alarms, so that application to an actual system is made difficult.

U.S. Pat. No. 5,832,115 discloses that templates having two concentric ellipses for detecting facial ellipses may be used to detect a facial location through evaluating the size of edge contours which encircle the face in a region between the two ellipses. However, even in this case, the same problem occurs in that the size and orientation of an elliptical template has to be determined and searched through all areas within the image.

In order to overcome such problems in facial location detection, many recent studies have focussed on the use of color images. Based on the fact that, in most color images, a color value in the color of a face or skin approximates a general statistical value, the study of extracting candidate facial areas by detection of skin color forms a mainstream (see J. Rehg, (COMPAQ TR CRL9811, 1998) & references therein). Recently, the studies have been successfully applied in color indexing, and facial tracking and extraction. However, the facial position extraction by a color is greatly affected by image obtaining conditions such as a camera which acquires an image, illumination color, and surface and state of an object. For example, two different cameras give different color values even in the same environment and for the same person, and in particular, a face or skin color value significantly changes depending on illumination. In a case in which the image obtaining conditions is unknown, it is difficult to determine the range of a skin color value for identifying only face color region. Furthermore, a process of determining only facial areas for similar skin colors which are widely extracted, including background regions, is not only a difficult task but requires many subsequent processes.

SUMMARY OF THE INVENTION

To solve the above problem, it is an objective of the present invention to provide an apparatus which is capable of accurately and quickly detecting a speaking person's eye and face position, and which is tolerant of image noise.

It is another objective of the present invention to provide a method of accurately and quickly detecting a speaking person's eye and face.

Accordingly, to achieve the above objective, an apparatus for a speaking person's eye and face detection according to an embodiment of the present invention includes an eye position detecting means for detecting pixels having a strong gray characteristic to determine areas having locality and texture characteristics as eye candidate areas among areas formed by the detected pixels, in an input red, blue, and green (RGB) image, a face position determining means for creating search templates by matching a model template to two areas extracted from the eye candidate areas, and determining an optimum search template among the created search templates by using the value normalizing the sum of a probability distance for the chromaticity of pixels within the area of a search template, and horizontal edge sizes calculated in the positions of the left and right eyes, a mouth and a nose estimated by the search template, and an extraction position stabilizing means for forming a minimum boundary rectangle by the optimum search template, and increasing count values corresponding to the minimum boundary rectangle area and reducing count values corresponding to an area other than the minimum boundary rectangle area, among count values of individual pixels, stored in a shape memory, to output the area in which count values above a predetermined value are positioned, as eye and face areas.

To achieve another objective of the present invention, a method of detecting a speaking person's eye and face includes the steps of detecting pixels having a strong gray characteristic to determine areas having locality and texture characteristics as eye candidate areas among areas formed by the detected pixels, in an input red, blue, and green (RGB) image, creating search templates by matching a model template to two areas extracted from the eye candidate areas, and determining an optimum search template among the created search templates by using the value normalizing the sum of a probability distance for the chromaticity of pixels within the area of a search template, and horizontal edge sizes in the positions of the left and right eyes, a mouth and a nose, estimated by the search template, in the RGB image, and forming a minimum boundary rectangle by the optimum search template, and increasing count values corresponding to the minimum boundary rectangle area and reducing count values corresponding to an area other than the minimum boundary rectangle area, among count values of individual pixels, stored in a shape memory, to output the area, in which count values above a predetermined value are positioned, as eye and face areas.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

In the present invention, an eye position, which is a representative facial feature, is extracted through the analysis of a common feature shown in a face which is obtained from various color images. Eyes in a face have a geometrically concave shape, so the brightness of the eyes represents a strong gray characteristic in an image. A representative color characteristic of the eyes is that the values of three principal components of an input color are similar in magnitude and are very low in brightness at the eye position. Furthermore, the brightness difference of colors of the pupil of eyes and a face is densely and locally distributed, so that it is characterized by texture in most images in which pupil contours are represented. In addition, since eye position is surrounded by a face color, it shows the characteristic of locality in which both color and texture characteristics locally occur. In the case of hair, it has a strong gray characteristic locally in the boundary portion, but such characteristic is shown wide and long. Thus, hair does not have the locality characteristic.

The present invention uses the above three main features as information for the initial detection of an eye position. After the eye position is detected through the combination of the three characteristics generated by the eyes, then the exact eye position is extracted through a combination of several subsequent processes and a face recognition process, and a face position is extracted using the information resulting therefrom. Furthermore, face position information extracted in this way may be used in an application of region of interest (ROI) in image transmission by a video phone.

Figure 1:
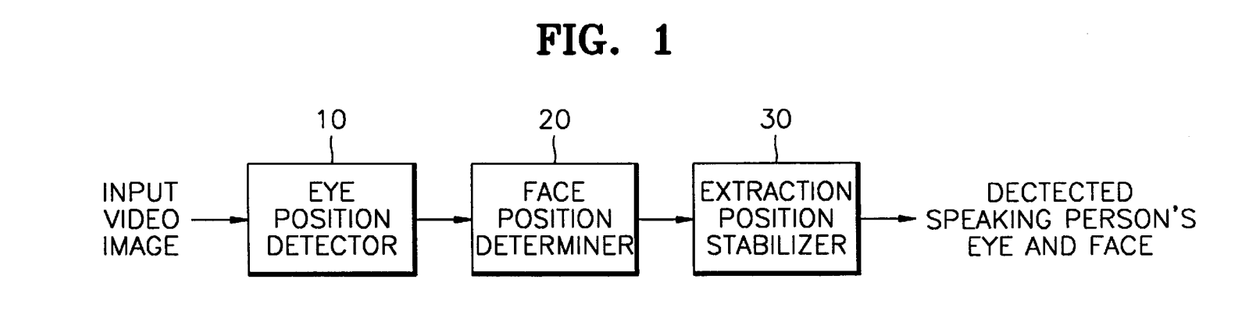
FIG. 1 is a block diagram illustrating the overall configuration of the present invention.

Referring to FIG. 1, an apparatus for enhancing an image quality by eye and face detection according to an embodiment of the present.invention includes an eye position detector 10 for determining an eye position in an input image, a face position determiner 20 for forming a face template using the detected eye position candidate points and matching the face template with image data in order to determine the eye and face positions, and an extraction position stabilizer 30 for preventing the extracted eye and face positions from being significantly changed in an image.

Figure 2:
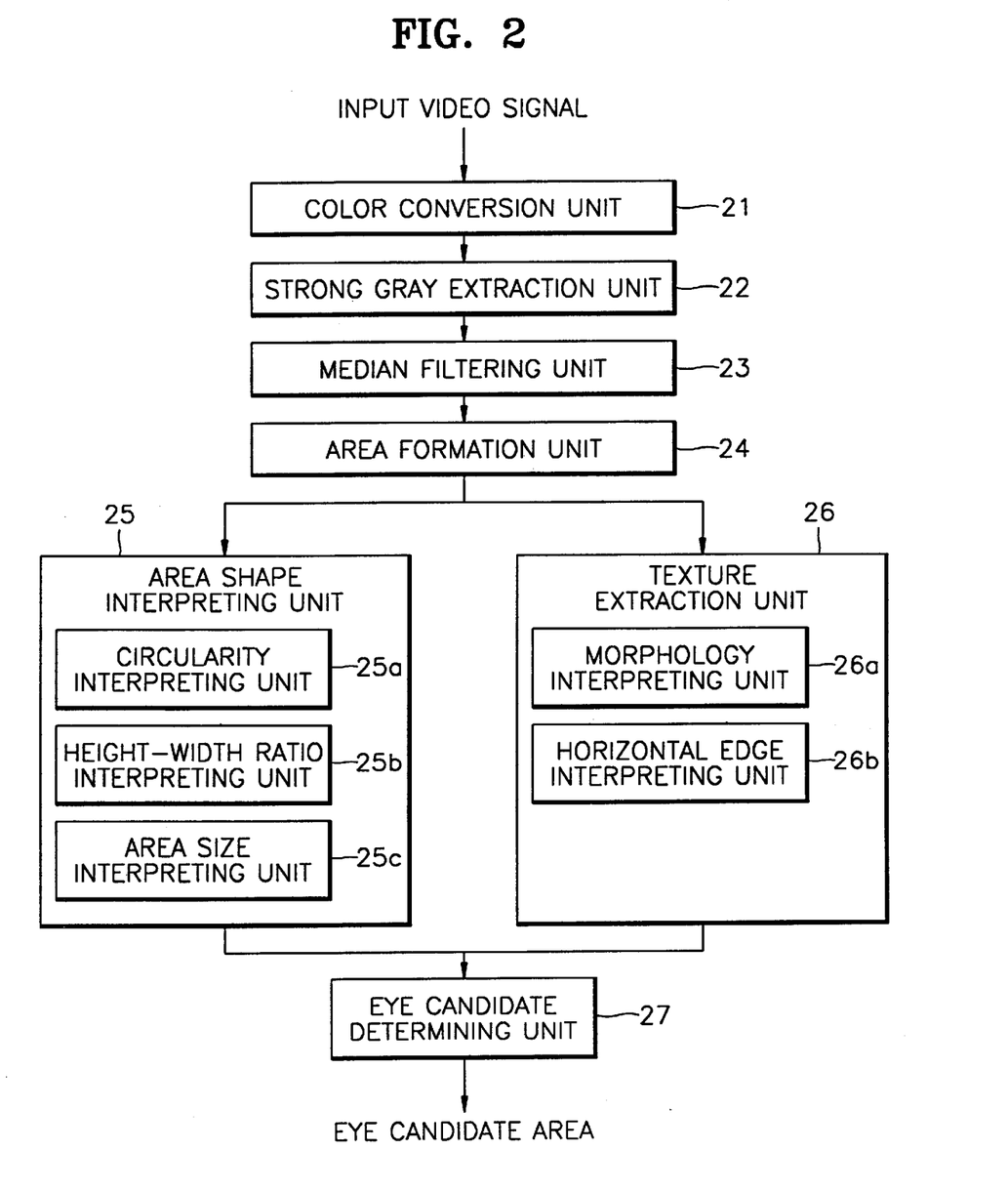
FIG. 2 is a detailed block diagram illustrating an eye position detector.

As shown in FIG. 2, the eye position detector 10 according to an embodiment of the present invention includes a color conversion unit 21, a strong gray extraction unit 22, a median filtering unit 23, an area formation unit 24, an area shape interpreting unit 25, a texture extraction unit 26, and an eye candidate determining unit 27. The color conversion unit 21 converts a video signal YUV of an input image to a three-color (RGB) signal. The strong gray extraction unit 22 interprets the RGB signal of the image to extract pixels having a strong gray characteristic. The strong gray extraction unit 21 uses features in which, if the difference between the maximum color value (MAXC) and the minimum color value (MINC) of each color component, which represents a color for a pixel, is less than a predetermined value t1, and the value MAXC is less than another predetermined value t2, then the pixel represents a strong gray characteristic. Herein, when the values of each color component are represented in the range of 0–255, preferably, t1 is determined in the range of 55–65 and t2 is determined in the range of 90–110. However, the scope of the present invention is not restricted to the above embodiment, and includes every known method of extracting strong gray pixels.

The median filtering unit 23 filters the extracted pixels with a median filter to blur out spot noise. The area formation unit 24 groups connected pixels together to form areas to each of which a corresponding label is provided. The area shape interpreting unit 25 includes a circularity interpreting unit 25a, a height-width ratio interpreting unit 25b, and an area size interpreting unit 25c. The circularity interpreting unit 25a interprets the shape of each labeled area to determine whether or not the shape approximates a circle. The height-width ratio interpreting unit 25b calculates the height-width ratio of each labeled area, and the area size interpreting unit 25c computes the relative size of each labeled area to examine the locality of each area.

The texture extraction unit 26 includes a morphology interpreting unit 26a and a horizontal edge interpreting unit 26b. The morphology interpreting unit 26a uses a morphology filter in each area to examine a texture characteristic by calculating a texture response. The horizontal edge interpreting unit 26b extracts a horizontal edge using a horizontal edge filter. As a morphology filter, a minimum morphology filter is preferably used (see M. Kunt, IEEE TCSVT, 1998), and a Sobel operator, which is a general differential filter, is used as a horizontal edge filter. Finally, the eye candidate determining unit 27 determines areas, among the labeled areas, in which locality and texture characteristics, respectively, are larger than predetermined values as eye candidate areas.

Figure 3:
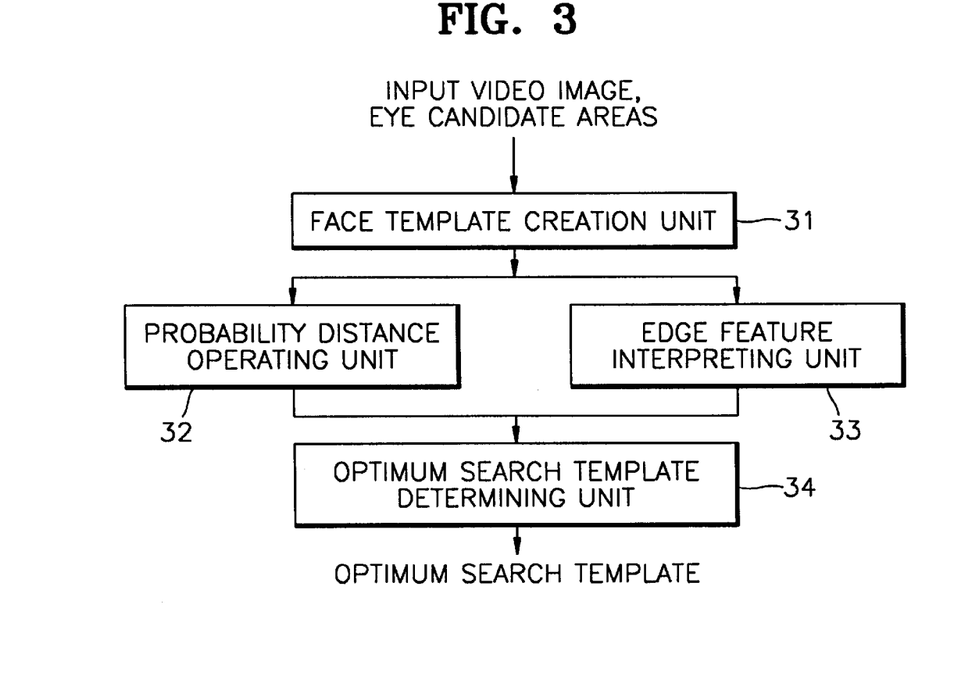
FIG. 3 is a detailed block diagram illustrating a face position determiner.

Referring to FIG. 3, the face position determiner 20 according to an embodiment of the present invention includes a face template creation unit 31, a probability distance operation unit 32, an edge feature interpreting unit 33 and an optimum search template determining unit 34. The face template creation unit 31 matches a model template previously provided to the positions of two areas extracted from the eye candidate areas to create a search template on an input RGB image by similarity transformation. Preferably, the model template is formed of a rectangle of a face area, including two circles indicative of the left and right eyes, the base of which is located between noise and mouth portions.

The probability distance operation unit 32 calculates the sum of probability distances of the skin colors at each pixel of a face area using the values of the color difference signals Cr and Cb of pixels within the search template area and previously trained statistical values, and then normalizes the sum of the probability distances over the size of search template. The edge feature interpreting unit 33 detects the horizontal edge feature of an input RGB image from estimated locations of eyes, nose and mouth in a search template. More specifically, the edge feature interpreting unit 33 detects a first horizontal edge size of the input RGB image, corresponding to the estimated locations of a mouth and a noise in the search template, and furthermore, detects a second horizontal edge size in the input RGB image corresponding to an area matched with the search template excluding the eyes, nose and mouth locations. Then, the edge feature interpreting unit 33 calculates an edge component ratio that is a ratio of the first horizontal edge size to the second horizontal edge size. In addition, the edge feature interpreting unit 33 can detect the horizontal edge size of eyes, normalized over the size of circles indicative of eye position.

The optimum search template determining unit 34 sets each predetermined weight to the normalized probability distance, edge component ratio and the normalized horizontal edge size of the eyes, to determine a template having the smallest sum thereof as an optimum search template. In the case in which an area in which a plurality of search templates are superimposed is located independently of an area in which other search templates are superimposed, the optimum search template determining unit 34 determines each optimum search template on the basis of an independent area. This is because a plurality of faces may be included within an image.

Figure 4:
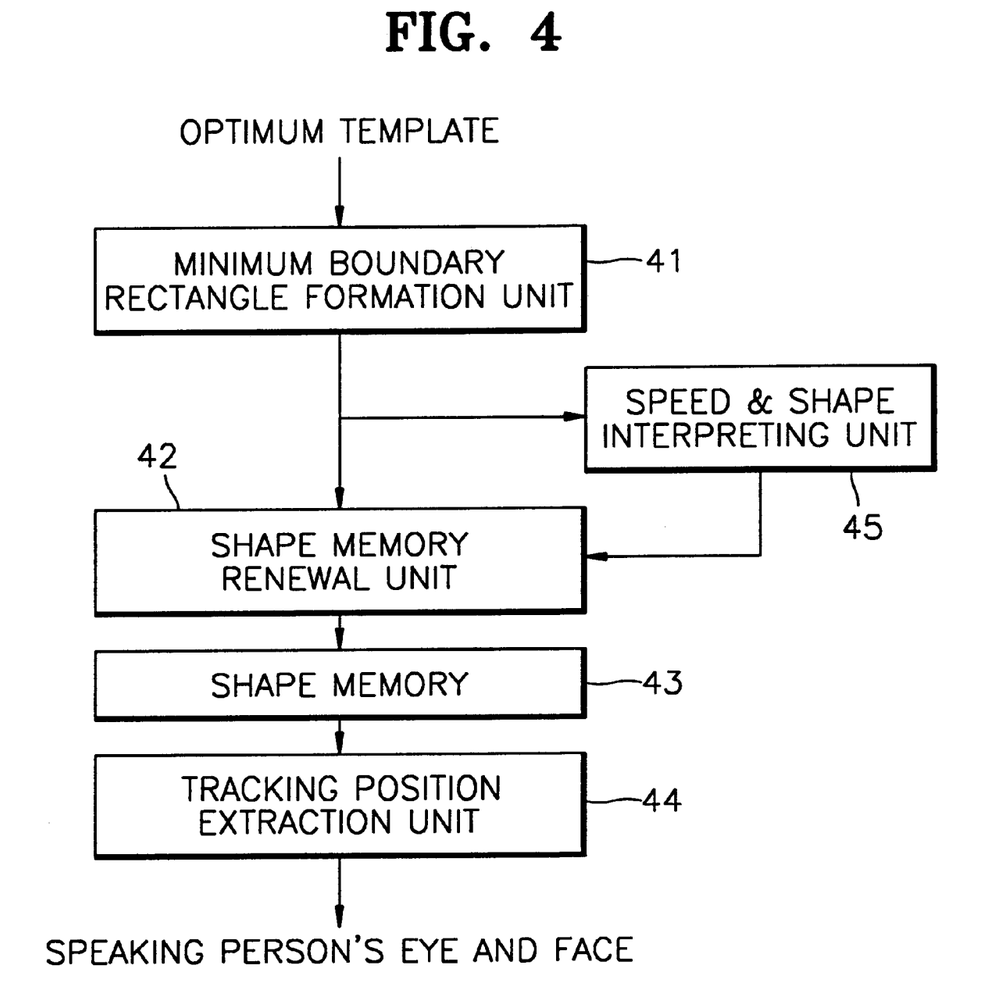
FIG. 4 is a detailed block diagram illustrating an extracted position stabilizer.

As shown in FIG. 4, the extraction position stabilizer 30 according to an embodiment of the present invention includes a shape memory 43, a minimum boundary rectangle (MBR) formation unit 41, a shape memory renewal unit 42, and a tracking position extraction unit 44, and furthermore, another embodiment may include a speed & shape interpreting unit 45. The shape memory 43 stores count values of the number of pixels corresponding to the size of an input RGB image (the height of the image times the width thereof). The MBR formation unit 41 forms a minimum boundary rectangle in which a facial image within an optimum search template is included. In the case of the search template, a rectangle is susceptible to rotation with regard to an image, depending on the relative positions of left and right eyes. However, the MBR includes a facial boundary determined by the optimum search template, and is formed with the same orientation as an image regardless of rotation of a face.

The shape memory renewal unit 42 increases count values corresponding to the area of an MBR, among pixel-based count values stored in the shape memory 43, and reduces count values corresponding to areas other than the MBR. The tracking position extraction unit 44 outputs areas, in which count values greater than or equal to a predetermined value are located, as a speaking person's eye and face areas. Furthermore, the speed & shape interpreting unit 45 calculates the area and moving speed of the MBR to control the range of values increased or reduced by the shape memory renewal unit 42.

Figure 5:
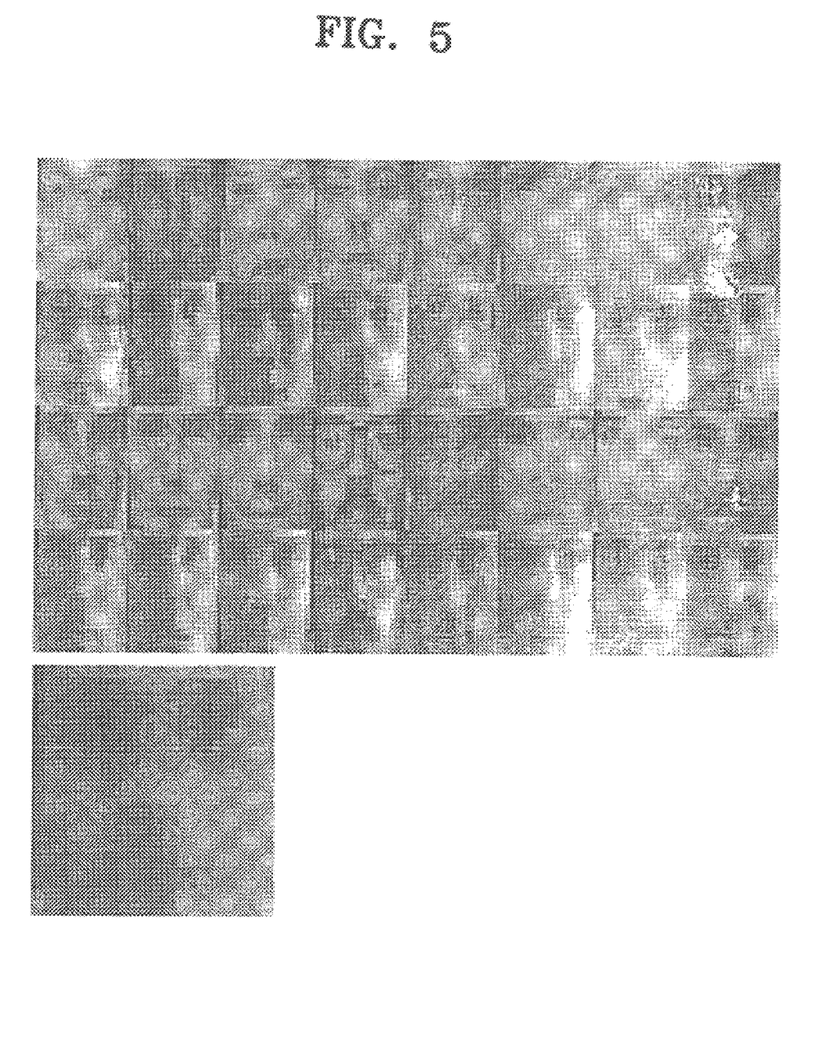
FIG. 5 illustrates the brightness distribution of a face shape.

The operation details of the present invention will be now described. At the outset, a process of determining eye candidate areas according to the present invention will be described with reference to FIGS. 2, 5, and 6A–6D. The present invention utilizes input video signals of a general still image or video color image. The video signal YUV of an input image is converted to a three-color (RGB) signal. The three important characteristics considered for eye position detection in the present invention are: the strong gray characteristic of eyes, the horizontal edge or texture characteristic of a position near eyes, and the locality of distribution. In order to explain the three characteristics. FIG. 5 shows thirty-two of frontal face images for sixteen people, i.e., two images per person, and an image averaging the frontal face images. As shown in each image of FIG. 5, the concavity of left and right eyes occurs in regions having a circular shape. The important point in the stage of determining eye candidate areas is to extract eye candidate points through combination of the three characteristics.

Figure 6A:
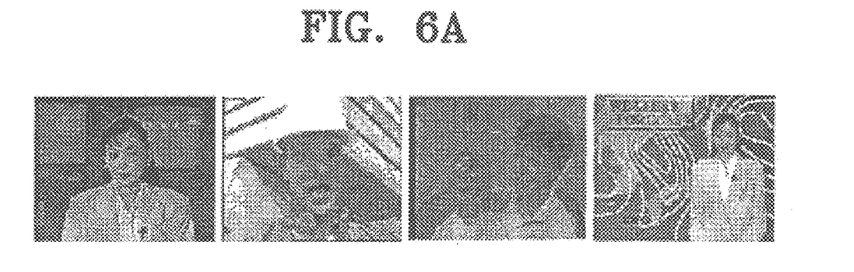
FIGS. 6A–6D illustrate a process of detecting candidate eye areas.

FIG. 6A illustrates four representative images used in Moving Picture Experts Group (MPEG) video clips. The images are mainly head & shoulder views in which a head and the upper part of body are shown. As shown in FIG. 6A, the eye portions of the images commonly represent a strong gray characteristic in which the portions are close to black. The gray characteristic is caused by the fact that eyes have a geometrically concave shape.

Figure 6B:
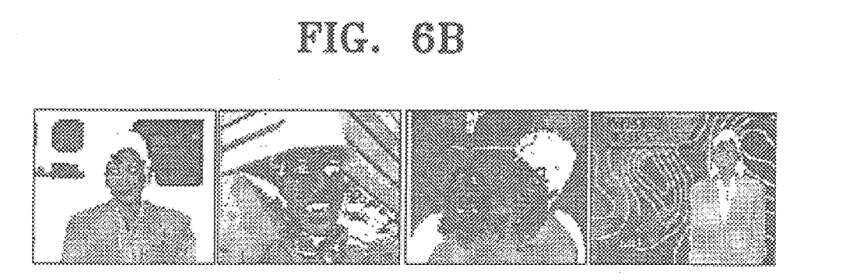

Therefore, the strong gray extraction unit 22 extracts pixels representing strong gray from the color signal of an image, using a characteristic in which a pixel represents strong gray if the difference between the maximum and minimum values of a color component representing color for the pixel is small and brightness is distributed low, FIG. 6B shows the extraction of pixels representing the strong gray characteristic. Referring to FIG. 6B, strong gray pixels in each image are indicated as white pixels by superimposing them on the original image, and dark portions of the background as well as eyes, in each image, are extracted When it comes to spatial distribution for the extracted pixels in image coordinates, the gray pixels of eye portions are localized on the inside of the skin area of a face, while gray pixels of background or head portions occur in large lumps or scattered widely. This means that a locality characteristic becomes the consistent feature of the eye portion, and accordingly only eye candidate areas can be extracted using the locality characteristic.

After performing median filtering and area labelling on the edge pixels output from the strong gray extraction unit 22, the area shape interpreting unit 25 calculates the size, circularity and height-width ratio of each area to remove areas having no locality characteristic. In the circularity measurement, it is necessary to search for areas whose shapes are close to a circle, irrespective of the orientation or size of the areas. Thus, an embodiment of the present invention preferably employs the following equations by Haralick [Computer & Robot Vision Addition-Wesley Pub., 1992] as a standard of measuring circularity and height-width ratio having such a characteristic:

$$\mu_R = \frac{1}{n}\sum_{k=0}^{n} \|(r_k - c_k) - (\bar{r} - \bar{c})\| \quad (1)$$

$$\sigma_R^2 = \frac{1}{n}\sum_{k=0}^{n} [\|(r_k - c_k) - (\bar{r} - \bar{c})\| - \mu_R]^2 \quad (2)$$

In the equations (1) and (2), the two values $\mu_R$ and $\sigma_R$ are defined in terms of pixels $r_k$ and $c_k$, where k denotes the index for pixels within a shape and goes from 0 to n, and ($\bar{r}, \bar{c}$) is the coordinate of an area center. The value of $\mu_R/\sigma_R$ measured from the two computed values indicates the circularity of the shape. If the value of $\mu_R/\sigma_R$ in an area is less than a predetermined value (The predetermined value is 1.2 in the preferred embodiment of the present invention, but the scope of the invention is not restricted to it.), there is a high likelihood of representing an area of random shape, so the corresponding area is excluded.

The MBR of an area is calculated to compute a height-width ratio. The height-width ratio is limited so that areas that are long in the vertical direction of an image are removed. In an embodiment of the present invention, areas the height-width ratio of which is less than 0.7 or greater than 3.5 are removed. Furthermore, areas in which the number of pixels is greater than or equal to a predetermined value are excluded. In an embodiment of the present invention, if the size of an area which is equivalent to the number of pixels in the height of the image multiplied by the number of pixels in the width thereof/1,600) is greater than a predetermined value, the area is excluded. However, the scope of the present invention is not restricted to the numeral limit used in an embodiment thereof.

Figure 6C:
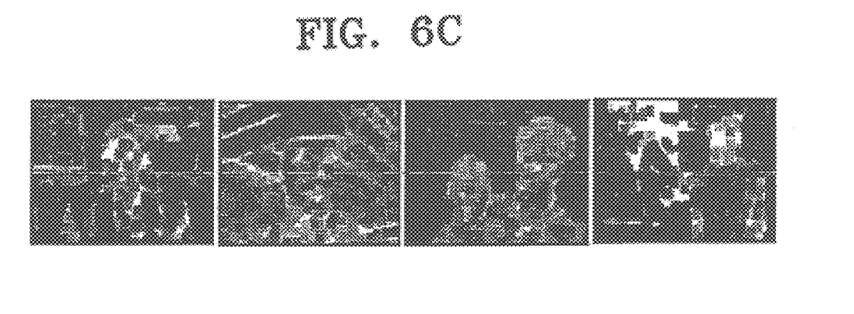

FIG. 6C shows a texture characteristic detected by a morphology operator. Referring to FIG. 6C, a strong response (magnitude of brightness) of a texture characteristic is extracted due to the densely localized brightness difference. The texture characteristic is represented strongly in an edge portion, not the boundary between areas. Furthermore, it can be found that a horizontal edge characteristic consistently exists, considering that the brightness difference strongly occurs in the vicinity of eyes, in a vertical direction. Thus, eye candidate areas can be finally determined by selecting only portions including strong horizontal edge and texture characteristics among eye area candidates extracted by area shape interpretation.

Figure 6D:
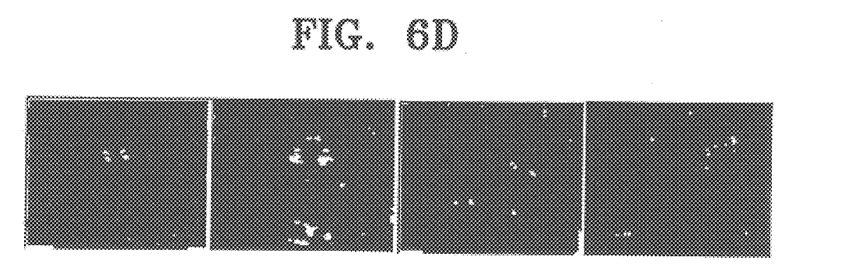

FIG. 6D illustrates the final eye candidate points thus extracted. Since a face has left and right eyes, if the positions of both eyes are determined, then the size, direction and location of a face template to be compared can be determined. In other words, the position of the eyes is determined by superimposing a face template according to the extracted eye candidate positions, and finally identifying a face area.

Figure 7A:
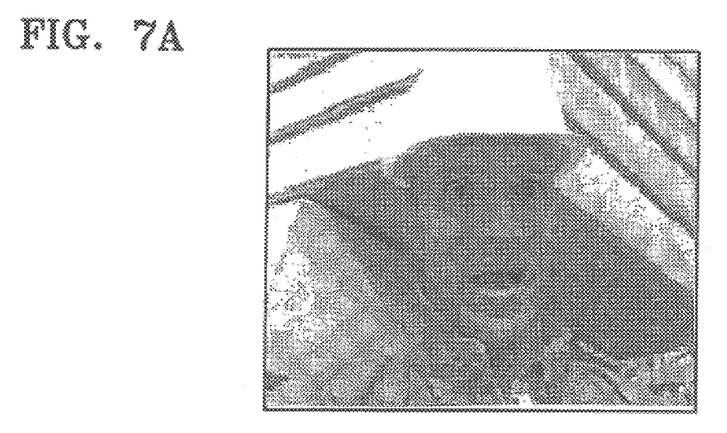
FIGS. 7A–7C illustrate a process of detecting a face position.
Figure 7B:
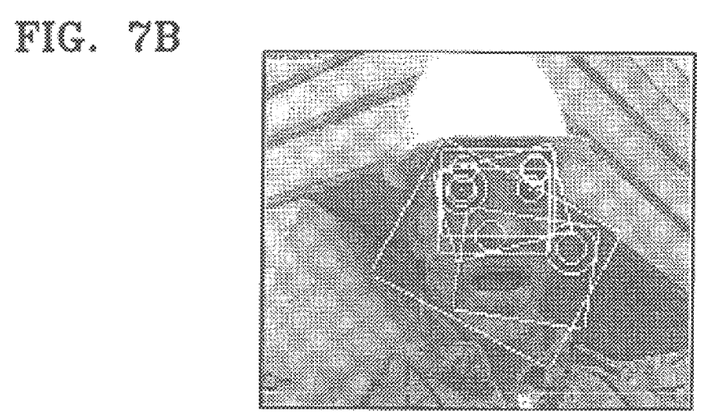
Figure 7C:
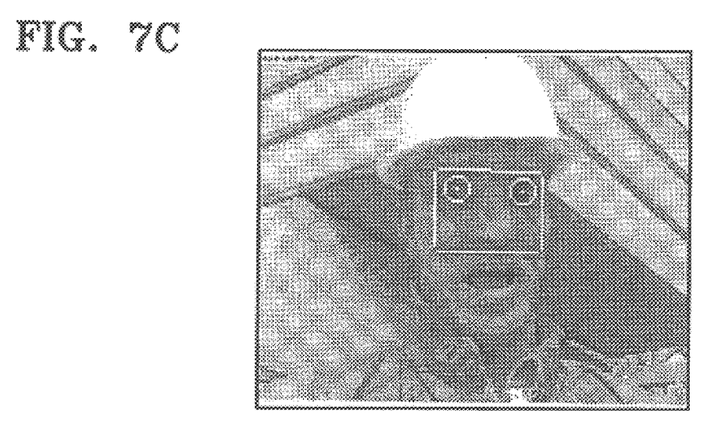
Figure 8:
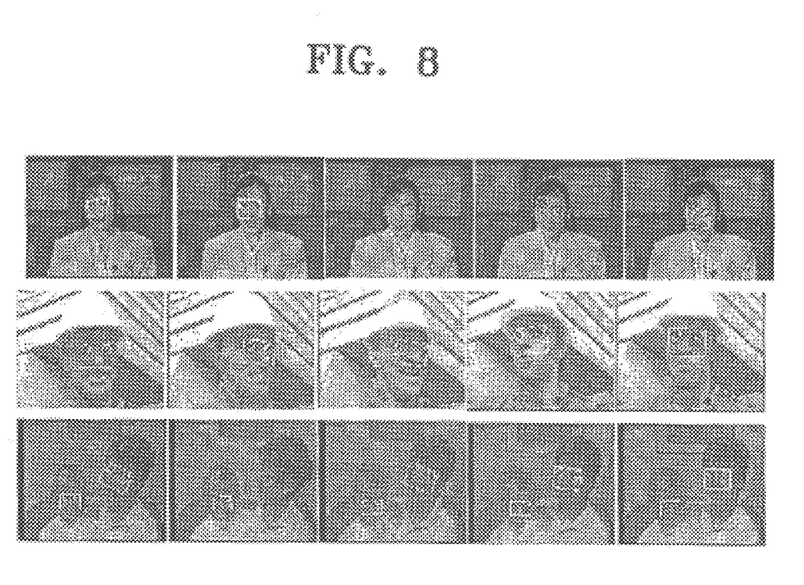
FIG. 8 illustrates the detection of a face position in a serial Moving Picture Experts Group (MPEG) image.

Next, a process of determining a face area will be now described with reference to FIGS. 3, 7A–7C, and 8. FIGS. 7A–7C explains a process of determining an optimum search template using a model template. FIG. 7B shows the shapes of a search face template matched by superimposing the search template on the selected eye candidate area. More particularly, a model template consists of a rectangular shape the size of which is changeable, and two circular shapes indicative of an eye position within the rectangular shape. In addition, the base of the rectangle of the model template is located between noise and mouth. Once the position of a pair of eye candidates is selected, the size, orientation, shape and location of the model template in the image are determined, so that the model template is superimposed on the eye candidate area. Subsequently, it is determined whether or not the selected eye candidate area actually represents eyes on a face by investigating the colors and geometrical characteristics of image areas contained within the overlapped model template. The model template similarity transforms into a search template with four factors. In this case, it is possible to determine a conversion factor because there are four equations and four unknowns. FIG. 7C indicates the finally recognized eye position and detected face area.

The following is a process of recognizing a face in the search template determined by the eye position. Firstly, a face takes on a skin color and the distribution of the skin color of humans has a given range. Many studies demonstrate that the reflection color of an object varies widely and largely depending on a change in illumination and shape, but the color of a face or skin has a specified value and a specified distribution in most images. In the light of this fact, it is possible to recognize face candidate areas by using distribution of a skin color. It can be assumed that a face color has a Gaussian distribution in a two-dimensional chrominance space. Thus, a skin color can be selected from thousands of MPEG video images to calculate a statistical value. Using the computed statistical value, it is possible to compute a probability distance indicating whether or not the internal areas of search templates superimposed as shown in FIG. 7B are close to a skin color. In an embodiment of the present invention, a mahalanobis distance is used as a probability distance.

$$d^2(x) = (x-\mu)^t \Sigma^{-1}(x-\mu) \quad (3)$$

In equation (3), d and x denote probability distance and vector value of an input color comprised of color difference signals $C_r$ and $C_b$, respectively. Furthermore, $\mu$ and $\Sigma$ indicate the average vector of trained skin color, and the variance matrix of trained value. As the sum of a mahalanobis distance for the chromaticity of the inside, normalized to the size of a template, becomes less, there is a greater likelihood of representing a face area.

Secondly, a mouth or a noise are positioned in the vicinity of the central portion of the base of the rectangular search template, and the horizontal edge component of this portion is large. In contrast, the remaining face area portions of the search template except the mouth, noise and eye portions, have a comparatively even brightness distribution, and there is no particular edge component. Thus, the ratio of horizontal edge components calculated in both areas is used as a discrimination value.

Thirdly, the horizontal edge of an eye portion is relatively large. Thus, the horizontal edge size of the eyes normalized by the size of circles indicative of the eye portion can be used for identifying a face. With respect to several search templates superimposed in FIG. 7B, the values of the above three factors, i.e. a mahalanobis distance, the ratio of a horizontal edge component and the horizontal edge size of the eyes, are calculated, and then a search template, having the smallest sum of the values, weighted corresponding to the importance of each factor, is selected as an optimum search template. If each search template is superimposed on a plurality of eye candidate areas corresponding thereto, only the search template that gives a minimum response is extracted. Furthermore, if an area formed by superimposing a plurality of search templates is located independently of an area formed by superimposing other search templates, it is determined that two or more people exist, and an optimum search template is determined on an area-by-area basis. The above processes facilitate detection of the eye position and face. In connection therewith, FIG. 8 exemplifies the positions of eyes and faces detected in typical serial MPEG images in which head & shoulders are shown.

Finally, an extraction stabilization process will now be described with reference to FIGS. 4 and 7C. The template of the eye and face extracted through face recognition as shown in FIG. 7C requires stabilizing in a serial image. Natural image sequences always have image noise generated by several causes such as an environment condition for obtaining sequences, and factors within an image input apparatus. Therefore, the image quality of two sequential images on a serial image input in quite a short time shows a different characteristic in many aspects. The image noise characteristic affects the computation of image feature value, so that the feature value calculated in the image changes many times along a time axis. The efficiency for image recognition and object detection is influenced by such instability factors, and also the position of the template of the eye and face shown in FIG. 7C tends to be extracted unstably in a serial image. In order to remove the instability factors, the present invention uses a technique of accumulating the MBR position information indicative of the boundary of an object to solve instability in a template extraction.

In general, an object having mass has a moment of inertia. When a human or an object moves in an image, a significant moving change rarely occurs in the minute intervals of a time axis. In particular, the spatial position of a human in a head & shoulder image is likely to be subsequently represented at a predetermined location, and seen from a serial image, the position increasingly changes at slow speed. In other words, there exists a temporal coherence for extracted positions between sequential image frames. Seen from video image obtained in units of 20–30 pieces per second, there are few occasions when an object on the left in the i-th frame appears suddenly on the right in the i+1-th frame. Using the temporal coherence of a time axis facilitates the extraction position stabilization and the sequential extraction and tracking of MBR. The process can be simply implemented by using a shape memory technique which will be described in the following.

Firstly, a shape memory having a space for storing the count value equivalent to the size of a video frame is secured to initialize count values corresponding to individual pixels. Next, inputs from n MBRs of the extracted face are received to increase the count values of a shape memory assigned to corresponding locations of pixels within the MBRs. Also in the subsequent image, the same number of MBRs are input to repeat the same process as for the preceding image. If the extracted MBRs are serially extracted in similar positions, count values in the corresponding positions of a shape memory continues to be increased. A count value is continuously increased until the value reaches a predetermined value, and when the value comes to the predetermined level, the value is maintained. Contrarily, in positions outside the MBRs, a count value of the shape memory is repeatedly reduced until the value comes to zero where it is maintained. In an embodiment of the present invention, the count value is in the range of 0–7. If the same process is repeatedly performed, only an object sequentially extracted in similar positions is stable enough to be the accurate extraction, while an object repeatedly extracted in random positions naturally has a low count value in the shape memory. Thus, an object can be determined to exist in only a portion indicating that the examined count value of a shape memory is above a predetermined threshold value. According to an embodiment of the present invention, only a portion indicating a count value above 3 is determined to be the position in which a face exists. However, the scope of the present invention is not restricted to the range of the count value and threshold value chosen in the preferred embodiment for identifying the positions of eye and face.

The advantage of the shape cumulative memory is that object detection and position stabilization can be simply accomplished and the operating speed is very fast, considering its efficiency. Furthermore, a count step can be controlled in such a way as to reduce or increase the count value depending on the size of MBR, the position of which is significantly changed or extracted, thereby adapting the memory to the speed of a moving object, importance of an object, or a shape characteristic. For example, if an object moves more slowly or if the face size of an object is comparatively small, a count step is preferably made large.

In a moving image communication by a moving image phone or mobile phone, a human face becomes the most important region of interest. Thus, when creating an image compressed by encoders such as MPEG-1, MPEG-2, MPEG4, and H.263, the image quality in a face area can be improved by using information of the extracted face area. This means that the present invention can appropriately be applied to an apparatus for controlling the entire amount of transmitted information and maintaining a high resolution image by transmitting only a face portion which is an ROI with a high resolution image, and transmitting the remaining background portion or a portion other than the ROI with a low resolution image or low amount of information.

The eye and face detection according to the preferred embodiment of the present invention may be embodied as a computer program which can be executed on a computer, and the program can be read out from recording media in which the program is recorded to execute it in a general-purpose digital computer system. The recording media includes magnetic storage media (e.g., ROM, floppy disk, hard disk, etc.), optical read memory (e.g., CD-ROM, DVD), and carrier wave (e.g., transmission through Internet).

The eye and face detection apparatus according to the present invention is capable of accurately and quickly detecting the eyes and face in an image and is tolerant of image noise. In other words, the present invention can be simultaneously applied to an image having a static background and an image having a dynamic background. In the course of detecting eye and face positions, high-speed processing and parallel processing are enabled by avoiding a search of the entire image. Furthermore, reliability enhanced eye and face detection is allowed in combination with movement detection, etc. The present invention can appropriately be used in applications such as video phones, monitoring systems requiring preservation of a face with a high resolution image, and content-based image searching.

While this invention has been particularly shown and described with reference to a preferred embodiment thereof, it will be understood by those skilled in the art that various changes in form and details may be made therein without departing from the spirit and scope of the invention as defined by the appended claims. Therefore, the described embodiment should be considered not in terms of restriction but in terms of explanation. The scope of the present invention is limited not by the foregoing but by the following claims, and all differences within the range of equivalents thereof should be interpreted to be covered by the present invention.

What is claimed is:

1. An apparatus for detecting a speaking person's eye and face, the apparatus comprising:

an eye position detecting means for detecting pixels having a strong gray characteristic to determine areas having locality and texture characteristics as eye candidate areas among areas formed by the detected pixels, in an input red, blue, and green (RGB) image;

a face position determining means for creating search templates by matching a model template to two areas extracted from the eye candidate areas, and determining an optimum search template among the created search templates by using the value normalizing the sum of a probability distance for the chromaticity of pixels within the area of a search template, and horizontal edge sizes calculated in the positions of the left and right eyes, a mouth and a nose estimated by the search template; and an extraction position stabilizing means for forming a minimum boundary rectangle by the optimum search template, and increasing count values corresponding to the minimum boundary rectangle area and reducing count values corresponding to an area other than the minimum boundary rectangle area, among count values of individual pixels, stored in a shape memory, to output the area in which count values above a predetermined value are positioned, as eye and face areas.

2. The apparatus of claim 1, wherein the eye position detecting means comprises:

a strong gray extraction unit for interpreting an input RGB image signal to extract pixels that represent a strong gray characteristic;

an area formation unit for forming areas by combining adjacent pixels with each other among the extracted pixels;

an area shape interpreting unit for detecting a locality characteristic for each formed area;

a texture extraction unit for detecting a texture characteristic for each formed area; and an eye candidate determining unit for determining areas in which the locality and texture characteristics, respectively, are greater than predetermined values as eye candidate areas, among the formed areas.

3. The apparatus of claim 1, wherein the face position determining means comprises:

a face template creation unit for creating search templates by matching a previously provided model template to the positions of the two areas extracted from the eye candidate areas to perform similarity transformation on the matched model template to create a search template in an input RGB image;

a probability distance operation unit for calculating a normalized probability distance for normalizing the sum of the probability distances for chromaticity of pixels within a search template area in an RGB image, with respect to the size of the search template;

an edge feature interpreting unit for detecting horizontal edge feature values of an RGB image input from the positions of eyes, a nose, and a mouth estimated in the search template; and an optimum search template determining unit for determining an optimum search template among a plurality of search templates created by the face template creation unit, according to the values obtained by setting predetermined weights on the normalized probability distance and the horizontal edge feature values.

4. The apparatus of claim 1, wherein the extraction position stabilizing means comprises:

a shape memory for storing the count values of the number of pixels corresponding to the size of the input RGB image;

a minimum boundary rectangle formation unit for forming a minimum boundary rectangle in which a face image is included within the optimum search template;

a shape memory renewal unit for increasing the count values corresponding to an area of the minimum boundary rectangle area and reducing the count values corresponding to an area outside the minimum boundary rectangle area, among count values of individual pixels stored in the shape memory; and a tracking position extraction unit for outputting an area in which count values above a predetermined value are positioned in the shape memory as a speaking person's eye and face areas.

5. The apparatus of claim 2, wherein the strong gray extraction unit extracts pixels of the RGB image, in each of which the difference between a maximum value and a minimum value of a color component representing a color is less than a predetermined value and the maximum value is less than another predetermined value, as pixels having a strong gray characteristic.

6. The apparatus of claim 2, wherein the area shape interpreting unit comprises a circularity interpreting unit for computing a circularity value of each area, and wherein the eye candidate determining unit removes an area, the circularity value of which is less than a predetermined value, from the eye candidate areas.

7. The apparatus of claim 2, wherein the area shape interpreting unit comprises a height-width ratio interpreting unit for computing the height-width ratio of each area; and wherein the eye candidate determining unit removes an area, the height-width ratio of which is less than a predetermined value or is greater than another predetermined value, from the eye candidate areas.

8. The apparatus of claim 2, wherein the area shape interpreting unit comprises an area size interpreting unit for computing the size of each area relative to the size of the overall image, and wherein the eye candidate determining unit removes an area, the relative size of which is greater than a predetermined value, from the eye candidate areas.

9. The apparatus of claim 2, wherein the texture extraction unit comprises a morphology interpreting unit with a minimum morphology filter for computing the texture response of each area; and wherein the eye candidate determining unit removes an area, the texture characteristic value of which is less than a predetermined value, from the eye candidate areas.

10. The apparatus of claim 2, wherein the texture extraction unit comprises a horizontal edge interpreting unit with a differential filter for detecting the horizontal edge of each area;

wherein the eye candidate determining unit removes an area, the horizontal edge characteristic value of which is less than a predetermined value, from the eye candidate areas.

11. The apparatus of claim 3, wherein the model template is formed of a rectangle including two circles indicative of the left and right eyes, in which the base of the rectangle is located between nose and mouth portions.

12. The apparatus of claim 3, wherein the probability distance d is calculated by the following equation:

$$d^2(x)=(x-\mu)^t\Sigma^{-1}(x-\mu)$$

where x is vector value of input color difference signals $C_r$ and $C_b$, $\mu$ is the average vector of previously trained skin color, and $\Sigma$ is the variance matrix of trained value.

13. The apparatus of claim 3, wherein the edge feature interpreting unit detects a first horizontal edge size of the input RGB image corresponding to the mouth and nose positions estimated in the search template, and a second horizontal edge size of the input RGB image corresponding to an area matched to the search template, except the positions of eyes, nose and mouth, and calculates the edge component ratio that normalizes the ratio of the first horizontal edge size to the second horizontal edge size.

14. The apparatus of claim 13, wherein the edge feature interpreting unit detects the horizontal edge size of areas of the RGB image corresponding to eyes normalized over the size of the circles indicative of the eye position, and wherein the optimum search template determining unit determines a template, having the smallest sum of the normalized probability distance, the edge component ratio, and the normalized horizontal edge size of areas of the RGB image corresponding to the eyes which are each set with predetermined weights, as an optimum search template.

15. The apparatus of claim 3, wherein, if an area that is formed by superimposing a plurality of search templates is located independently of an area formed by superimposing other search templates, the optimum search template determining unit determines optimum search templates of independent areas.

16. The apparatus of claim 4, further comprising a speed & shape interpreting unit for computing the size and moving speed of the minimum boundary rectangle to control the range of values increased or reduced by the shape memory renewal unit.

17. A method of detecting a speaking person's eye and face areas, the method comprising the steps of:

(a) detecting pixels having a strong gray characteristic to determine areas having locality and texture characteristics as eye candidate areas among areas formed by the detected pixels, in an input red, blue, and green (RGB) image;

(b) creating search templates by matching a model template to two areas extracted from the eye candidate areas, and determining an optimum search template among the created search templates by using the value normalizing the sum of a probability distance for the chromaticity of pixels within the area of a search template, and horizontal edge sizes in the positions of the left and right eyes, a mouth and a nose, estimated by the search template, in the RGB image; and (c) forming a minimum boundary rectangle by the optimum search template, and increasing count values corresponding to the minimum boundary rectangle area and reducing count values corresponding to an area other than the minimum boundary rectangle area, among count values of individual pixels, stored in a shape memory, to output the area, in which count values above a predetermined value are positioned, as eye and face areas.

18. The method of claim 17, wherein the step (a) comprises the steps of:

(a1) interpreting an input RGB image signal to extract pixels that represent a strong gray characteristic;

(a2) forming areas by combining adjacent pixels with each other among the extracted pixels;

(a3) detecting a locality characteristic in each formed area;

(a4) detecting a texture characteristic in each formed area; and (a5) determining areas, in which the locality and texture characteristics, respectively, are greater than predetermined values, among the formed areas, as eye candidate areas.

19. The method of claim 17, wherein the step (b) comprises the steps of:

(b1) creating search templates in the RGB image by matching a previously provided model template to the positions of the two areas extracted from the eye candidate areas, to perform similarity transformation on the matched model template;

(b2) calculating a normalized probability distance for normalizing the sum of the probability distance for chromaticity of pixels within a search template area by the size of the search template, in the RGB image;

(b3) detecting horizontal edge feature values of the RGB image input from the positions of eyes, a nose, and a mouth estimated in the search template; and (b4) determining an optimum search template among a plurality of search templates created by the face template creation unit, by using the values obtained by setting predetermined weights on the normalized probability distance and the horizontal edge feature value.

20. The apparatus of claim 17, wherein the step (c) comprises the steps of (c1) forming the minimum boundary rectangle in which a face image is included within the optimum search template;

(c2) increasing the count values corresponding to an area of the minimum boundary rectangle and reducing the count values corresponding to an area outside the minimum boundary rectangle area, among count values of individual pixels stored in the shape memory; and (c3) outputting an area in which count values above a predetermined value are positioned in the shape memory as a speaking person's eye and face areas.

21. The method of claim 18, wherein, in the step (a1), pixels of the RGB image, for each of which the difference between a maximum value and a minimum value of a color component representing a color is less than a predetermined value, and the maximum value is less than another predetermined value, are extracted as pixels having a strong gray characteristic.

22. The method of claim 18, wherein, in the step (a3), the circularity value of each area is calculated, and wherein, in the step (a5), an area, the circularity value of which is less than a predetermined value, is removed from the eye candidate areas.

23. The method of claim 18, wherein, in the step (a3), the height-width ratio of each area is calculated; and
  wherein an area, the height-width ratio of which is less than a predetermined value or is greater than another predetermined value, is removed from the eye candidate areas.

24. The method of claim 18, wherein, in the step (a3), the size of each area relative to the size of the overall image is calculated, and
  wherein, in the step (a5), an area, the relative size of which is greater than a predetermined value, is removed from the eye candidate areas.

25. The method of claim 18, wherein, in the step (a4), the texture response of each area is calculated; and
  wherein, in the step (a5), an area, the texture characteristic value of which is less than a predetermined value, is removed from the eye candidate areas.

26. The method of claim 18, wherein, in the step (a4), the horizontal edge of each area is detected; and
  wherein, in the step (a5), an area, the horizontal edge characteristic value of which is less than a predetermined value, is removed from the eye candidate areas.

27. The method of claim 19, wherein the model template is formed of a rectangle including two circles indicative of the left and right eyes, the base of which is located between noise and mouth portions.

28. The method of claim 19, wherein the probability distance d is calculated by the following equation:

$$d^2(x) = (x-\mu)^t \Sigma^{-1}(x-\mu)$$

where x is vector value of input color difference signals $C_r$ and $C_b$, $\mu$ is the average vector of previously trained skin color, and $\Sigma$ is the variance matrix of trained value.

29. The method of claim 19, wherein, in the step (b3), a first horizontal edge size of the input RGB image corresponding to the mouth and nose positions estimated in the search template, and a second horizontal edge size of the input RGB image corresponding to an area matched to the search template, except the positions of eyes, nose and mouth, are detected, and the edge component ratio that is a ratio of the first horizontal edge size to the second horizontal edge size is calculated.

30. The method of claim 29, wherein the step (b3) further comprises the step of detecting the horizontal edge size of areas of the RGB image corresponding to normalized by the size of the circles indicative of the eye positions, and
  wherein, in the step (b4), a template, having the smallest sum of the normalized probability distance, the edge component ratio, and the normalized horizontal edge size of the areas of the RGB image corresponding to the eyes, which are each set with predetermined weights, is determined as an optimum search template.

31. The method of claim 19, wherein, in the step (b4), if an area that is formed by superimposing a plurality of search templates is located independently of an area formed by superimposing other search templates, the optimum search template determining unit determines optimum search templates of independent areas.

32. The method of claim 20, after the step (c1), further comprising the step of computing the size and moving speed of the minimum boundary rectangle to control the range of values increased or reduced by the shape memory renewal unit.

\* \* \* \* \*